Oct. 25, 1927.
B. SANNI
1,646,664
VEHICLE
Filed Oct. 14, 1926   3 Sheets-Sheet 1
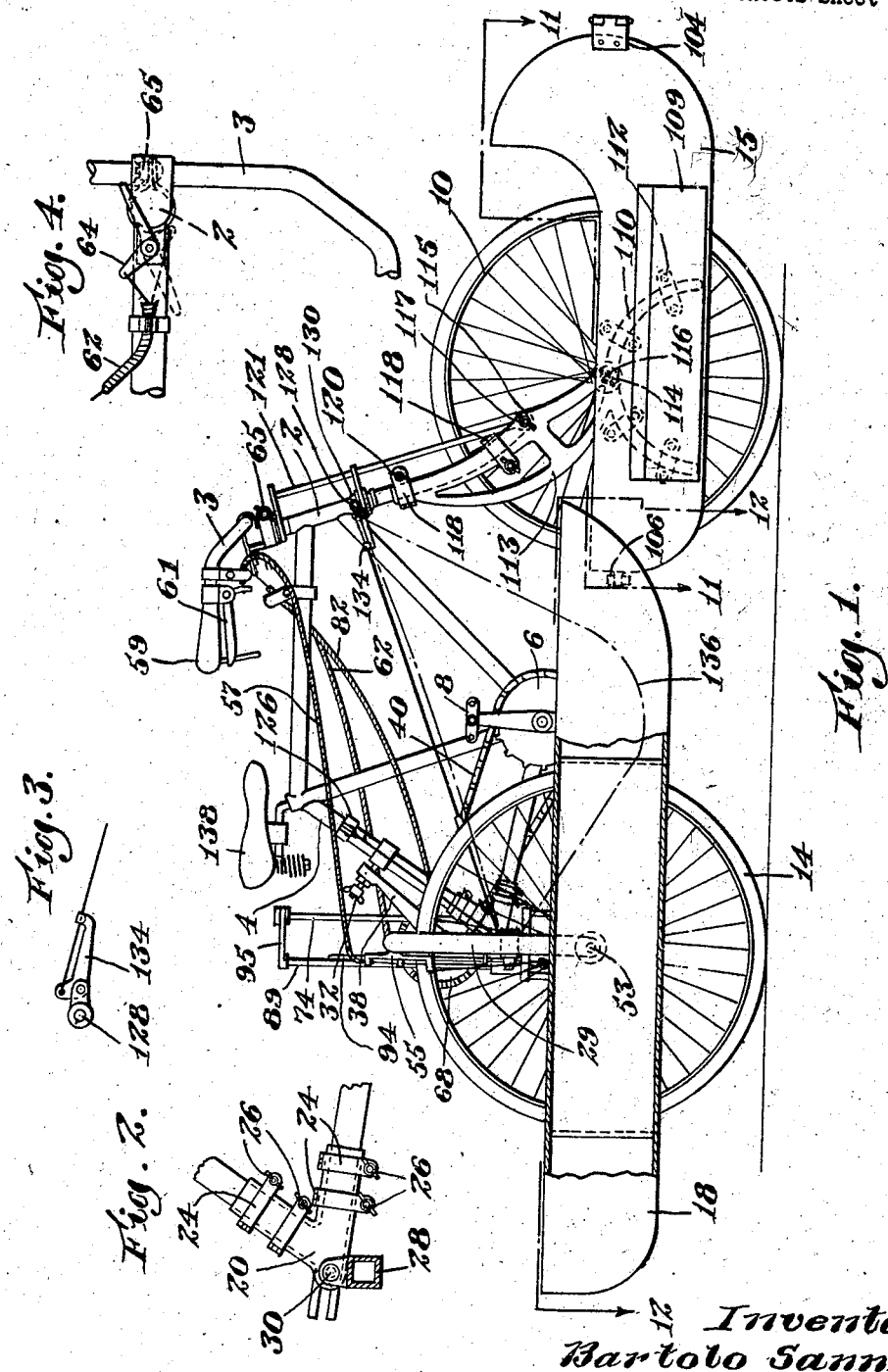
Inventor
Bartolo Sanni
by David Rines
Attorney Oct. 25, 1927.
B. SANNI
1,646,664
VEHICLE
Filed Oct. 14, 1926
3 Sheets-Sheet 2
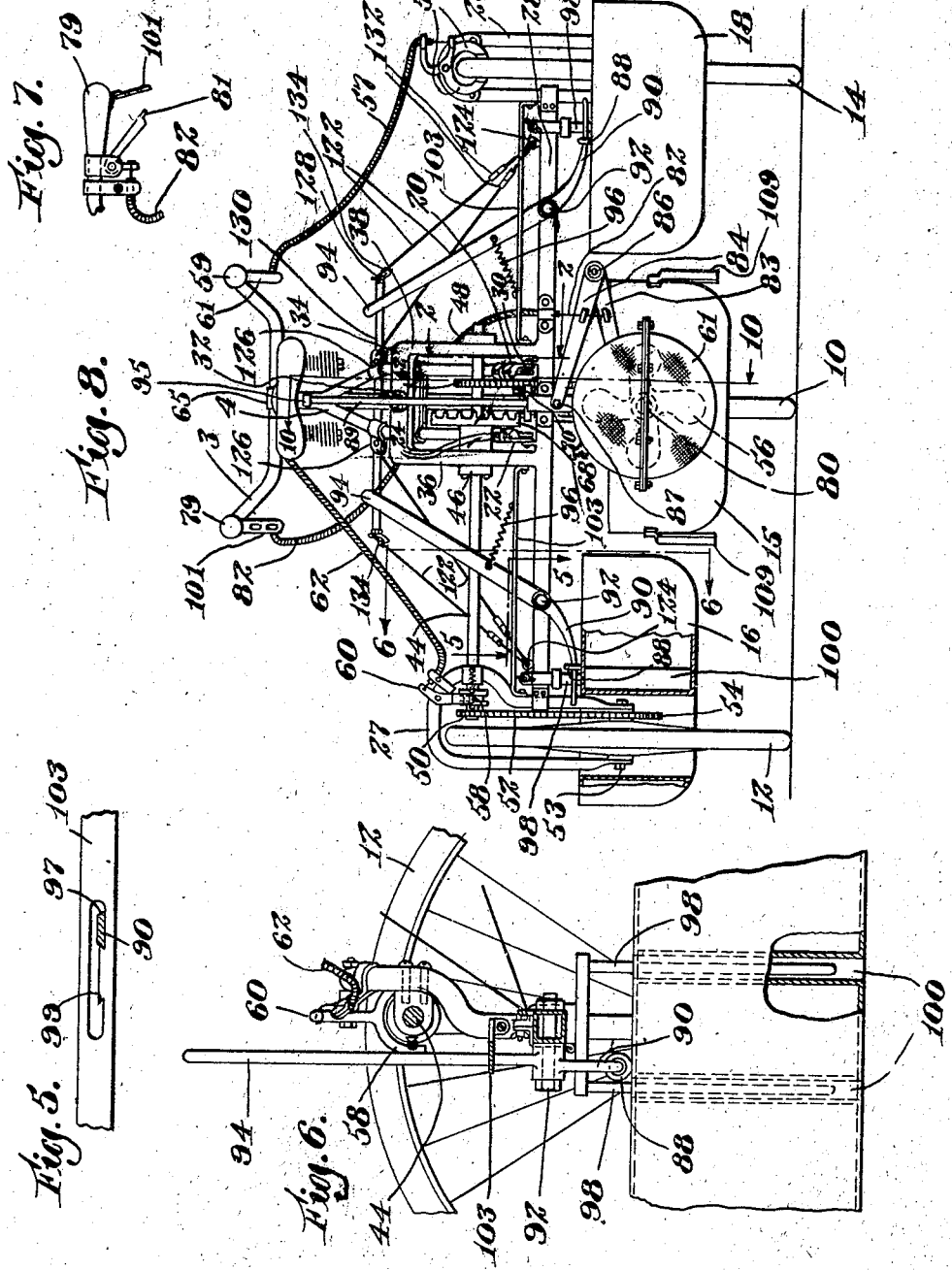
Inventor
Bartolo Sanni
by
Attorney

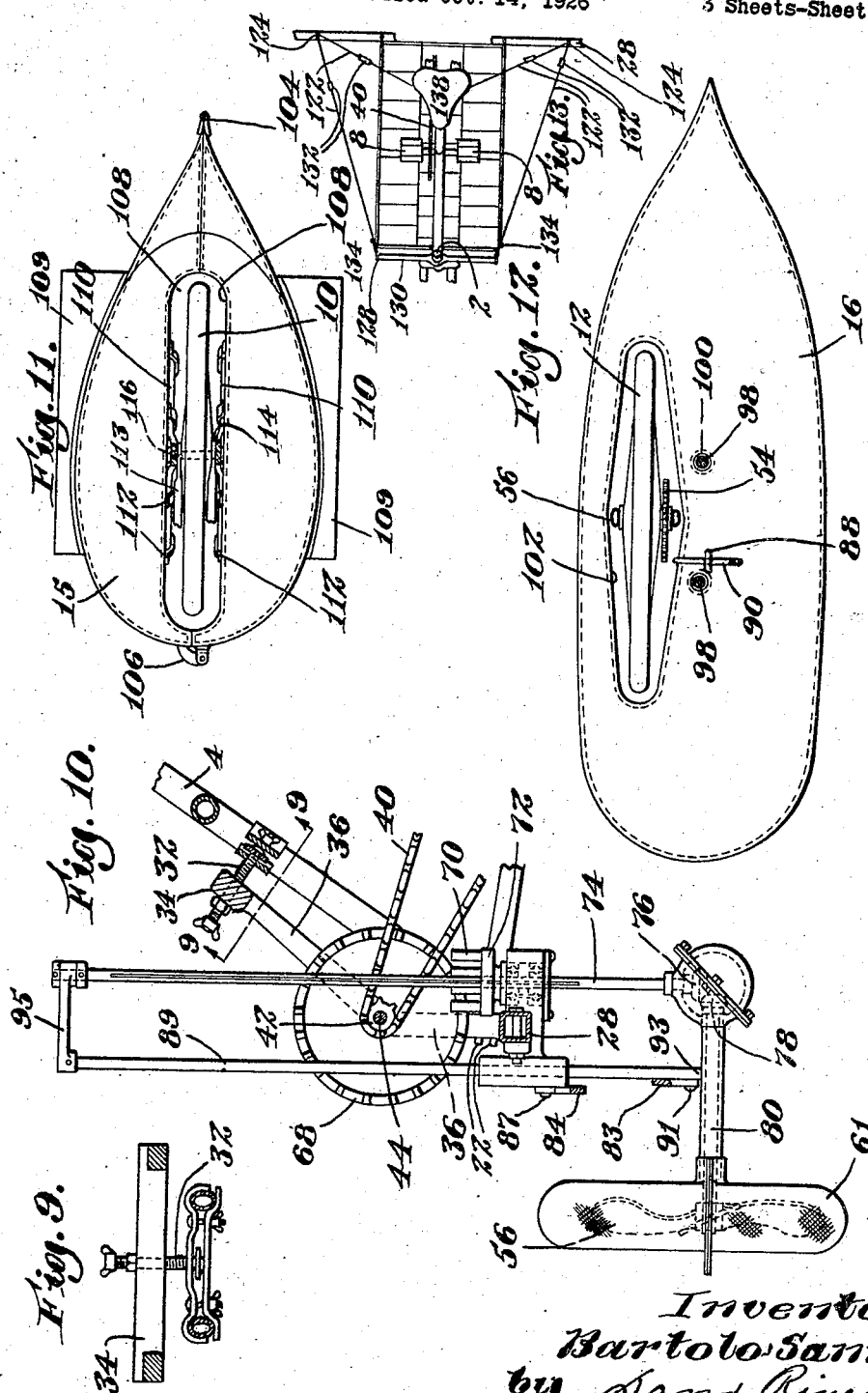

Patented Oct. 25, 1927.

1,646,664

UNITED STATES PATENT OFFICE.

BARTOLO SANNI, OF BOSTON, MASSACHUSETTS.

VEHICLE.

Application filed October 14, 1926. Serial No. 141,509.

The present invention relates to vehicles adapted to travel either on land or in water, and the chief object of the invention is to provide a new and improved vehicle of this character. Other and further objects will be explained hereinafter and will be particularly pointed out in the appended claims.

The invention will be explained in connection with the accompanying drawings, in which Fig. 1 is a side elevation, partly in longitudinal section, of a vehicle constructed in accordance with a preferred embodiment of the present invention; Fig. 2 is a section taken upon the line 2—2 of Fig. 8, looking in the direction of the arrows; Fig. 3 is a view of a preferred cable-tension-releasing mechanism; Fig. 4 is a fragmentary plan of the handle bar and connected parts; Fig. 5 is a section taken upon the line 5—5 of Fig. 8, looking in the direction of the arrows; Fig. 6 is a section taken upon the line 6—6 of Fig. 8, looking in the direction of the arrows, upon a larger scale; Fig. 7 is a detail view of one of the handles of the handle-bar mechanism, with connected parts; Fig. 8 is a rear elevation of the vehicle; Fig. 9 is a section taken upon the line 9—9 of Fig. 10, looking in the direction of the arrows; Fig. 10 is a section taken upon the line 10—10 of Fig. 8, looking in the direction of the arrows; Fig. 11 is a section taken upon the line 11—11 of Fig. 1, looking in the direction of the arrows; Fig. 12 is a section taken upon the line 12—12 of Figs. 1 and 8, looking in the direction of the arrows; and Fig. 13 is a fragmentary plan, upon a reduced scale.

The invention is shown applied to a vehicle of the tricycle form, though it will be understood that it is equally applicable to bicycles, motor cycles, and other vehicles of well-known type. The tricycle comprises a forward steering fork 2, controlled by a handle bar 3, and a rear fork 4. A driving sprocket 6 is controlled by two pedals 8. The forward or steering wheel 10 is mounted on the steering fork 2 and the rear wheels 12 and 14 are mounted at the rear of the vehicle. These wheels are mounted in a manner different from that which ordinarily obtains in tricycles and which will presently be explained. The wheels are used when the vehicle is traveling on land. To support the vehicle in water, it is provided with a plurality of floats. A front float 15 is shown mounted about the steering wheel 10 and rear floats 16 and 18 are mounted at the rear of the vehicle, as will be described hereinafter.

To mount the rear wheels 12 and 14, two castings 20 and 22 are screwed, one upon each of the lower ends of the rear fork 4, by means of hinged collars 24 and winged nuts 26, as shown more particularly in Fig. 2, or in any other desired way. From these castings depends a bar 28, shown as of square tubular form, but it may be of any other desired form. The ends of the bar are provided with wheel supports 27 and 29 in which the wheels 12 and 14, respectively, are journaled. The bar is pivoted on the castings 20 and 22 about horizontally disposed pivots 30 and carries a sub-frame comprising a bell-crank lever rising integrally upward and constituted of two parallelly disposed, bell-crank arms 36, 38 connected at their upper ends by an arm 34. An adjusting screw 32 is threaded through the arm 34 and into engagement with the rear fork 4. The bell-crank lever 34, 36, 38 and the bar 28 integral therewith are thus pivotally adjustable as a unit about the pivots 30 by the set screw 32. A sprocket chain 40 passes over the driving sprocket 6 and a driven sprocket 42. The sprocket 42 is mounted upon an axle 44 that is journaled in ball bearings 46 and 48 provided upon the arms 36 and 38. The adjusting screw 32 thus provides for adjusting the sub-frame and tensioning the sprocket chain 40.

The axle 44 is shown extending horizontally across the rear portion of the vehicle, approximately parallel to the bar 28, and the sprocket 42 is shown mounted near one end of this axle. The opposite end of the axle is provided with another sprocket 50 over which is mounted a sprocket chain 52. The sprocket chain 52 connects the sprocket 50 with a sprocket 54 that is fixed to the wheel 12, so as to drive the same. The pedals 8, driving the sprocket wheel 6, the sprocket chain 40, and the sprocket wheel 42, cause the axle 44 to be rotated; this, in turn, drives the sprocket 50, which causes the rotation of the sprocket 54 through the sprocket chain 52; and the sprocket 54 drives the wheel 12 about its axle 53. A positive drive is thus obtained upon the rear wheel 12 only, the wheels 14 and 10 being loosely driven by friction with the ground. This construction permits the wheel 10 to be steered, and it permits turning the wheel 14 about the wheel 12 as a pivot, or vice versa, all without interfering with the driving mechanism of the wheel 12. The wheel 12 is provided with an ordinary coaster brake. The wheel 14 may be braked by separate brakes 55 controlled by a cable 57 through a lever 61 at one of the handles 59 of the handle bar.

It is desirable to drive the wheels only when the vehicle is traveling over the land, and to operate the vehicle from one or more propellers 56 when the vehicle is driven over the water. Each propeller is mounted in a wire-net casing 61 to protect it against sea-weed and other foreign matter.

Provision is made for disconnecting the sprocket wheel 50 from the axle 44 by means of a clutch 58 when the vehicle is used in the water. This may be effected by operating a lever mechanism 60 through a cable or other connection 62 by means of a pivoted bell crank 64 just below the center 65 of the handle bars. The bell crank 64 is shown in Fig. 4 in full and dotted lines, occupying its extreme positions.

The propeller 56 is also driven from the axle 44. To this end, the axle 44 is provided with a toothed wheel 68, the teeth of which engage teeth 70 of a toothed wheel 72. The toothed wheel 72 is splined to a vertically disposed shaft 74. The shaft 74 passes through the center of the wheel 72 and is provided with a beveled gear 76 that meshes with a gear 78 of a horizontally disposed shaft 80. The propeller 56 is secured to the shaft 80. When the vehicle is traveling over the land, it is desired to raise the propeller 56 up above the position that it occupies when the vehicle is in the water. This may be effected by merely moving the shaft 74 vertically through the toothed wheel 72. In order to permit such vertical adjustment without interference by the axle 44, the shaft 74 is displaced horizontally with respect to the axle 44, as is clearly shown in Fig. 10.

Obviously, not one propeller alone, but any number, may be provided, merely by having additional toothed wheels 68 upon the axle 44 and cooperating toothed wheels 70 displaced from this axle. Each toothed wheel 70 will have a vertically adjustable shaft 74 splined thereto, each driving a propeller 56. If one such propeller is provided directly below the right-hand end of the axle 44, as viewed in Fig. 8, the toothed wheels 68 and 70 may be replaced by beveled gears and the corresponding shaft 74 may be mounted for vertical adjustment in the vertical plane passing through the axle 44, as in that case there would be no interference between the axle 44 and the adjustment of the shaft 74.

The vertical adjustment of the shaft 74 may be effected in any desired way. It is preferred to control this adjustment by a lever 81, situated near the other handle 79 of the handle bar, and acting through a cable 82 upon a lever 83 near the propeller. One end of the lever 83 is pivoted to one end of a lever 84 at 86. The other end of the lever 84 is pivoted to the frame of the machine at 87, and the other end of the lever 83 is pivoted to a vertically guided bar 89 at 91. By pulling on the cable 82, therefore, by pressing the lever 81, the rider will raise the lever 83, causing a toggle-like action of the levers 83 and 84 and the resulting raising of the bar 89. The lower end of the bar 89 is fixed to the bearing of the shaft 80 at 93 and a cross bar 95 connects together the upper ends of the bar 89 and the shaft 74. Raising of the bar 89, therefore, results in raising of the shaft 74 and the propeller 56 as a unit, without breaking the driving connection between the propeller and the axle 44. The lever 81 may be locked in position by a latch 101.

A clutch (not shown) may be employed to disconnect the propeller 56 from its driving mechanism when it is raised. This clutch may be thrown out when the clutch 58 is thrown in, and vice versa, or it may be thrown in when the propeller is lowered and thrown out when the propeller is raised. This clutch mechanism is not illustrated, in order to simplify the drawings, but its mechanical details will be obvious to persons skilled in the art.

The floats 16 and 18 are shown in raised position, such as they would occupy when the vehicle is traveling over the land. In order to lower these floats,—which may be desirable when the vehicle is on the water,—the floats are each provided with an eye 88 through which extends a lever 90 that is pivoted to the bar 28 at 92 and that may be operated by a handle 94. The handle 94 is normally maintained in the illustrated position by a spring 96, but may be actuated in opposition to the force of the spring, to cause a lowering of the floats 16 and 18, as shown in Fig. 6. During the raising and lowering of the floats, they are guided by guide bars 98 that extend downward from the bar 28 and into guide openings 100 of the floats. The movement of the lever 90 is limited by stops 97 and 99 in a guide 103, as shown in Fig. 5.

As will be clear from Figs. 8, 11 and 12, the floats are each provided with an opening through which the wheels and their supports extend. In the case of the floats 16 and 18, the opening 102 is somewhat off center, as illustrated in Fig. 12, in order that a greater portion of the float may be within the boundary of the vehicle than outside thereof, thereby to prevent the floats projecting too far beyond the sides of the vehicle. The floats 16 and 18 are each in one piece, with the openings 100 and 102 integrally formed therein. The float 15, however, is constituted of two separate floats, hinged together at the front, as shown at 104, and secured together at the rear, as shown at 106. Each of these separate floats is provided with an intermediately disposed recess 108, the two recesses between them forming the opening through which the wheel 10 extends. The outer side of each of the floats 15 is provided with a steering rudder 109. On the wall of each recess 108 there is secured a framework 110 in any suitable way, as shown at 112, each framework being provided with an opening 114 within which the ends of the axle 116 of the wheel 10 are received. Integral with the framework 110 is an upwardly rising member 113 provided with an opening 115 adapted to receive a pin 117 that extends through correspondingly positioned openings at the bottom of the front fork 2 and in which, in the ordinary tricycle, the front wheel 10 is journaled. The member 113 is secured to the front fork 2 in any desired way as by means of hinged collars 118 and winged nuts 120. This construction permits ready removal and remounting of the floats 15 and permits turning the wheel 10 and the float 15 as a unit for steering purposes. A reinforcing rod 121 may be secured to the front fork 2 in any desired manner to brace the rod against strains.

To steady the vehicle, cables 122 connect eyes 124 at the ends of the bar 28 with various portions of the vehicle such as the upper portion of the rear fork 4, as indicated at 126, and other portions such as the ends 128 of a horizontally disposed bar 130 near the front fork 2. The cables may be tensioned in any desired way, as by means of turnbuckles 132. The cables may be slackened at will by means of latches 134, shown more particularly in Fig. 3. These latches also loosen a waterproof bag 136 that houses the driving parts of the vehicle and prevents entry of water. The bag is shown in full lines in Fig. 13 and dot-and-dash lines in Fig. 1, extending from the front to the rear of the vehicle. The front connectors may be loosened by slackening the cable by means of the latches 134. The loosening of the cables is also sometimes desirable for women riders, as the cables have a tendency to interfere with mounting and dismounting.

The vehicle is shown provided with a single seat 138, but obviously a frame work may be provided carrying several seats.

Other modifications, too, will occur to persons skilled in the art and all such are considered to fall within the spirit and scope of the present invention as defined in the appended claims.

What is claimed is:

1. A land-and-water vehicle comprising a frame having two rear wheels and a front wheel, a float carried by the frame near each wheel, each float having an opening through which the corresponding wheel extends, and means for turning the front wheel and the corresponding float to steer the vehicle.

2. A land-and-water vehicle comprising a horizontally disposed bar, wheels journaled at the ends of the bar, floats carried at the ends of the bar, means carried by the bar for adjusting the floats, and means carried by the bar for guiding the adjustment of the floats.

3. A land-and-water vehicle comprising a tricycle frame having a forward steering fork, a rear fork and a driving sprocket, a wheel journaled in the steering fork, a float mounted on the steering fork, a bar mounted on the ends of the rear fork, wheels journaled near the ends of the bar, one of the wheels having a driven sprocket, floats mounted at the ends of the bar, a driving axle having two sprockets, a sprocket chain connecting one of the two sprockets with the driving sprocket, a sprocket chain connecting the other of the two sprockets with the driven sprocket, a clutch for disconnecting the said other of the two sprockets from the driving axle, an adjustable propeller, a shaft adjustable with the propeller, a toothed wheel through which the shaft is adjustably splined on the shaft, the shaft and the toothed wheel being offset from the driving axle, and a toothed wheel fixed on the driving axle for engaging the first-named toothed wheel to drive the propeller.

4. A vehicle of the class described comprising a tricycle frame having a rear fork and a driving sprocket, a sub-frame mounted on the ends of the rear fork having a driven sprocket and a bar, a sprocket chain connecting the sprockets, wheels journaled near the ends of the bar, and means for adjusting the sub-frame on the rear fork to tension the sprocket chain.

5. A vehicle of the class described comprising a tricycle frame having a rear fork, a bar mounted on the lower ends of the rear fork, wheels journaled near the ends of the fork, and steadying cables connecting the ends of the bar with the upper portion of the rear fork.

6. A land-and-water vehicle comprising means for driving the vehicle on land, means for driving the vehicle in water, and a waterproof bag in which the driving means is positioned to shield the driving means from the water.

7. A land-and-water vehicle comprising wheels for supporting the vehicle on land, floats for supporting the vehicle in water, means for driving one of the wheels and having a coaster brake, and a separate brake for another wheel.

8. A vehicle of the class described comprising a tricycle frame having a rear fork, a bar mounted on the lower ends of the rear fork, wheels journaled near the ends of the bar, steadying cables connecting the ends of the bar with the upper portion of the rear fork, means for driving the vehicle, and means for housing the driving means, the cables being constructed and arranged to hold the housing means in position.

9. A land-and-water vehicle comprising a frame having a handle bar, a wheel mounted on the frame for driving the vehicle on land, a propeller mounted on the frame for driving the vehicle in water, a brake for the wheel, means positioned near the handle bar for actuating the brake, and means positioned near the handle bar for adjusting the propeller.

10. A land-and-water vehicle comprising a frame having a handle bar, means for driving the vehicle on land, means for driving the vehicle in water, a pedal for actuating the two driving means, means positioned near the handle bar for connecting one of the driving means to and disconnecting it from the pedal, and means connected near the handle bar for controlling the other driving means.

11. A land-and-water vehicle comprising a frame having two rear wheels and a front wheel, a float carried by the frame near each wheel, each float having an opening through which the corresponding wheel extends, means for turning the front wheel and the corresponding float to steer the vehicle, and a steering rudder carried by the front float.

12. A land-and-water vehicle comprising a frame having a forward steering fork, a rear fork and a driving sprocket, a wheel journaled in the steering fork, a float mounted on the steering fork, rear wheels carried by the rear fork, one of the wheels having a driven sprocket, floats mounted near the rear wheels, a driving axle, means for driving the rear wheel from the driving axle, an adjustable propeller, a shaft for driving the propeller and adjustable with the propeller, means for driving the shaft from the driving axle, and means for raising and lowering the shaft and the propeller without breaking its driving connection with the axle.

In testimony whereof, I have hereunto subscribed my name.

SANNI, BARTOLO.